US007165076B2

(12) United States Patent
Bentley

(10) Patent No.: US 7,165,076 B2
(45) Date of Patent: Jan. 16, 2007

(54) SECURITY SYSTEM WITH METHODOLOGY FOR COMPUTING UNIQUE SECURITY SIGNATURE FOR EXECUTABLE FILE EMPLOYED ACROSS DIFFERENT MACHINES

(75) Inventor: Joseph Bentley, San Jose, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 621 days.

(21) Appl. No.: 10/249,829

(22) Filed: May 9, 2003

(65) Prior Publication Data
US 2004/0098599 A1 May 20, 2004

Related U.S. Application Data

(60) Provisional application No. 60/426,620, filed on Nov. 15, 2002.

(51) Int. Cl.
G06F 17/30 (2006.01)
(52) U.S. Cl. ......................... 707/104.1; 707/9
(58) Field of Classification Search .............. 707/1–10, 707/100–104.1, 200–206; 713/200–202, 713/187; 726/23; 709/203, 316
See application file for complete search history.

(56) References Cited

U.S. PATENT DOCUMENTS

| | | | |
|---|---|---|---|
| 4,914,586 A | 4/1990 | Swinehart et al. | 707/101 |
| 5,475,817 A | 12/1995 | Waldo et al. | 709/316 |
| 5,586,260 A | 12/1996 | Hu | 713/201 |
| 5,623,601 A | 4/1997 | Vu | 713/201 |
| 5,764,887 A | 6/1998 | Kells et al. | 713/200 |
| 5,815,574 A | 9/1998 | Fortinsky | 713/153 |
| 5,828,833 A | 10/1998 | Belville et al. | 713/201 |
| 5,832,211 A | 11/1998 | Blakley et al. | 713/202 |
| 5,838,903 A | 11/1998 | Blakely et al. | 713/202 |
| 5,857,191 A | 1/1999 | Blackwell et al. | 707/10 |
| 5,864,665 A | 1/1999 | Tran | 713/201 |
| 5,875,296 A | 2/1999 | Shi et al. | 713/202 |
| 5,881,230 A | 3/1999 | Christensen et al. | 709/203 |
| 5,966,702 A * | 10/1999 | Fresko et al. | 707/1 |
| 5,987,611 A | 11/1999 | Freund | 713/201 |
| 6,802,006 B1 * | 10/2004 | Bodrov | 713/187 |
| 6,966,002 B1 * | 11/2005 | Torrubia-Saez | 705/51 |
| 6,996,843 B1 * | 2/2006 | Moran | 726/23 |

OTHER PUBLICATIONS

Microsoft Corporation, MSDN—ImageGetDigestStream, Microsoft Windows Platform SDK, Debugging and Error Handling, 2002.
Williams, R., A Painless Guide to CRC Error Detection Algorithms, Rocksoft Pty Ltd., Aug. 19, 1993.
Rivest, R., RFC 1321: The MD5 Message-Digest Algorithm, MIT Laboratory for Computer Science, Apr. 1992.

* cited by examiner

Primary Examiner—Jeffrey Gaffin
Assistant Examiner—Yicun Wu
(74) Attorney, Agent, or Firm—John A. Smart

(57) ABSTRACT

A security system with methodology for computing a machine independent unique identifier for an executable file across different machines is described. In response to a request to uniquely identify an executable file that has been installed on a given machine, portions of the executable file modified as a result of installation of the executable file on the given machine are identified. A machine independent unique identifier is determined by performing a calculation on the executable file. The calculation is performed by excluding at least the identified portions of the executable file modified as a result of installation of the executable file on the given machine.

47 Claims, 4 Drawing Sheets

SECURITY SYSTEM WITH METHODOLOGY FOR COMPUTING UNIQUE SECURITY SIGNATURE FOR EXECUTABLE FILE EMPLOYED ACROSS DIFFERENT MACHINES

CROSS REFERENCE TO RELATED APPLICATIONS

The present application is related to and claims the benefit of priority of the following commonly-owned, presently-pending provisional application(s): application Ser. No. 60/426,620, filed Nov. 15, 2002, entitled "Security System with Methodology for Computing Unique Signature for Executable File Employed across Different Machines", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix.

The Appendix, which comprises text files that are IBM-PC machine and Microsoft Windows Operating System compatible, includes the below-listed files. All of the material disclosed in the Computer Program Listing Appendix can be found at the U.S. Patent and Trademark Office archives and is hereby incorporated by reference into the present application.

Object Description: AddZimpBlock.txt, created: May 6, 2003 9:26 am, size: 1.25 KB; Object ID: File1; Object Contents: Source Code.

Object Description: ImprovedSkimpFromFile.txt, created: May 6, 2003 9:18 am, size: 1.0 KB; Object ID: File2; Object Contents: Source Code.

Object Description: ProcessBoundImports.txt, created: May 6, 2003 9:22 am, size: 1.58 KB; Object ID: File3; Object Contents: Source Code.

Object Description: ProcessFile.txt, created: May 6, 2003 9:19 am, size: 3.48 KB; Object ID: File4; Object Contents: Source Code.

Object Description: ProcessIAT.txt, created: May 6, 2003 9:22 am, size: 0.2 KB; Object ID: File5; Object Contents: Source Code.

Object Description: ProcessImports.txt, created: May 6, 2003 9:24 am, size: 2.43 KB; Object ID: File6; Object Contents: Source Code.

Object Description: SkimpFromFile.txt, created: May 6, 2003 9:13 am, size: 0.77 KB; Object ID: File7; Object Contents: Source Code.

Object Description: UpdateSkimpDigest.txt, created: May 6, 2003 9:17 am, size: 0.3 KB; Object ID: File8; Object Contents: Source Code.

Object Description: ZeroImportBlocks.txt, created: May 6, 2003 9:27 am, size: 2.13 KB; Object ID: File9; Object Contents: Source Code.

BACKGROUND OF INVENTION

1. Field of the Invention

The present invention relates generally to systems and methods for maintaining security of computer systems connected to one or more networks (Local Area Networks or Wide Area Networks) and, more particularly, to a security system with methodology for computing unique security signature for executable file employed across different machines.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs". In both cases, maintaining security and controlling what information a computer user could access was relatively simple because the overall computing environment was limited and clearly defined.

In traditional computing networks, a desktop computer largely remained in a fixed location and was physically connected to a single local network (e.g., via Ethernet). More recently, however, an increasingly large number of business and individual users are using portable computing devices, such as laptop computers, that are moved frequently and that connect into more than one network. For example, many users now have laptop computers that can be connected to networks at home, at work, and in numerous other locations. Many users also have home computers that are remotely connected to various organizations from time to time through the Internet. The number of computing devices, and the number of networks that these devices connect to, has increased dramatically in recent years.

In addition, various different types of connections may be utilized to connect to these different networks. A dial-up modem may be used for remote access to an office network. Various types of wireless connectivity, including IEEE (Institute of Electrical and Electronics Engineers) 802.11 and Bluetooth, are also increasingly popular. Wireless networks often have a large number of different users that are occasionally connected from time to time. Moreover, connection to these networks is often very easy, as connection does not require a physical link. Wireless and other types of networks are frequently provided in cafes, airports, convention centers, and other public locations to enable mobile computer users to connect to the Internet. Increasingly, users are also using the Internet to remotely connect to a number of different systems and networks. Thus, it is becoming more common for users to connect to a number of different systems and networks from time to time through a number of different means.

As more and more computers are connecting to a number of different systems and networks (including the Internet), a whole new set of security challenges face network administrators and individual users alike. Security is of growing importance and a user and administrators have taken a variety of steps to secure systems and networks, including the use of firewalls, end point security modules, network intrusion detection routines, and the like. Among the steps that have been taken to improve security is file integrity checking. File integrity checking is a way to determine if files have been created, removed or, perhaps most importantly, altered on a system. A similar integrity checking process is also typically used when messages, files, or other data are exchanged between systems.

File integrity checking generally involves passing the file contents through a hashing function, and generating a unique value, referred to as a "checksum", that represents the hashed value of the contents. A checksum is a mathematical value that is assigned to a file and can be used to "test" the file at a later date to verify that the data contained in the file has not been changed (e.g., maliciously altered or damaged during transmission). A checksum is created by performing a complicated series of mathematical operations (e.g., by using a hashing technique such as MD5 or CRC32) that translate the data in the file into a fixed string of digits. This hashed value or checksum is then used for comparison purposes. Checksums are used in data transmission and data storage and are also known as message authentication codes, message digests, integrity check-values, modification detection codes, or message integrity codes. Another feature of checksums is that they are typically of a fixed length irrespective of the size of a source file. For example, a CRC32 checksum is 32 bits.

These features of the checksums may be used for revealing that files have been damaged or compromised (e.g., in data transmission), for comparing files for identity, and for detecting unauthorized modifications to a file. For example, a file integrity checker typically computes a checksum for every guarded file and stores this checksum. At a later time a checksum for the file can again be computed and the current value tested against the stored value to determine if the file has been modified.

Although computing a checksum is a useful technique, there are a number of challenges in computing and using a checksum, particularly in situations in which a given file (e.g., an executable file such as an application program) may be installed on a number of different machines which may utilize different operating systems. One issue is that for a given executable file (e.g., program, driver, data file, or the like), a checksum calculated on two different machines may be dramatically different because of differences in the machine environment rather than any substantive difference in the executable file itself. For example, a checksum calculated for Microsoft Outlook on a machine running Windows 95 will usually be drastically different than a checksum calculated for the same version of Microsoft Outlook on a machine running Windows 2000. On both machines, the size of a particular version of Microsoft Outlook will be the same (e.g., 700 kilobytes). However, the checksum will be different, primarily because the binding of the file on the two machines will differ because of the different operating systems employed.

The Microsoft Windows operating system provides a function called "ImageGetDigestStream", which provides a partial filter for the purpose of file integrity checking. However, this filter does not provide sufficient accuracy for the purpose of clearly determining file identity, because the filter frequently generates different data streams (and hence, different checksums) for executable files on different installations.

What is required is a solution which enables the computation of a checksum on an executable file (e.g., program, driver, data file, loadable library, or the like) in order to uniquely identify that file across different machines. The present invention provides a solution for these and other needs.

SUMMARY OF THE INVENTION

A security system with methodology for computing a machine independent unique identifier for an executable file across different machines is described. In response to a request to uniquely identify an executable file that has been installed on a given machine, portions of the executable file modified as a result of installation of the executable file on the given machine are identified. A machine independent unique identifier is determined by performing a calculation on the executable file. The calculation is performed by excluding at least the identified portions of the executable file modified as a result of installation of the executable file on the given machine.

In another embodiment, a method for calculating a fingerprint for a program capable of operating on a number of platforms is described. The program capable of operating on a plurality of different platforms comprises segments having platform-specific features and segments without platform-specific features. When a request to calculate a fingerprint for a program installed on a particular computer is received, the segments of the program without platform-specific features are identified. The fingerprint for the program is calculated based on the segments of the program identified to be without platform-specific features, such that the fingerprint is calculated without the segments of the program that have platform-specific features.

In another embodiment, a method for generating a unique signature for a file that has been installed comprises: installing the file on a particular machine; examining the file to determine portions of the file that are unmodified during installation of the file on the particular machine; and generating a unique signature for the file based on the portions of the file determined to have been unmodified during installation, so that the unique signature is generated without taking into account those portions of the file that have been modified during installation.

DETAILED DESCRIPTION

Glossary

Figure 1:
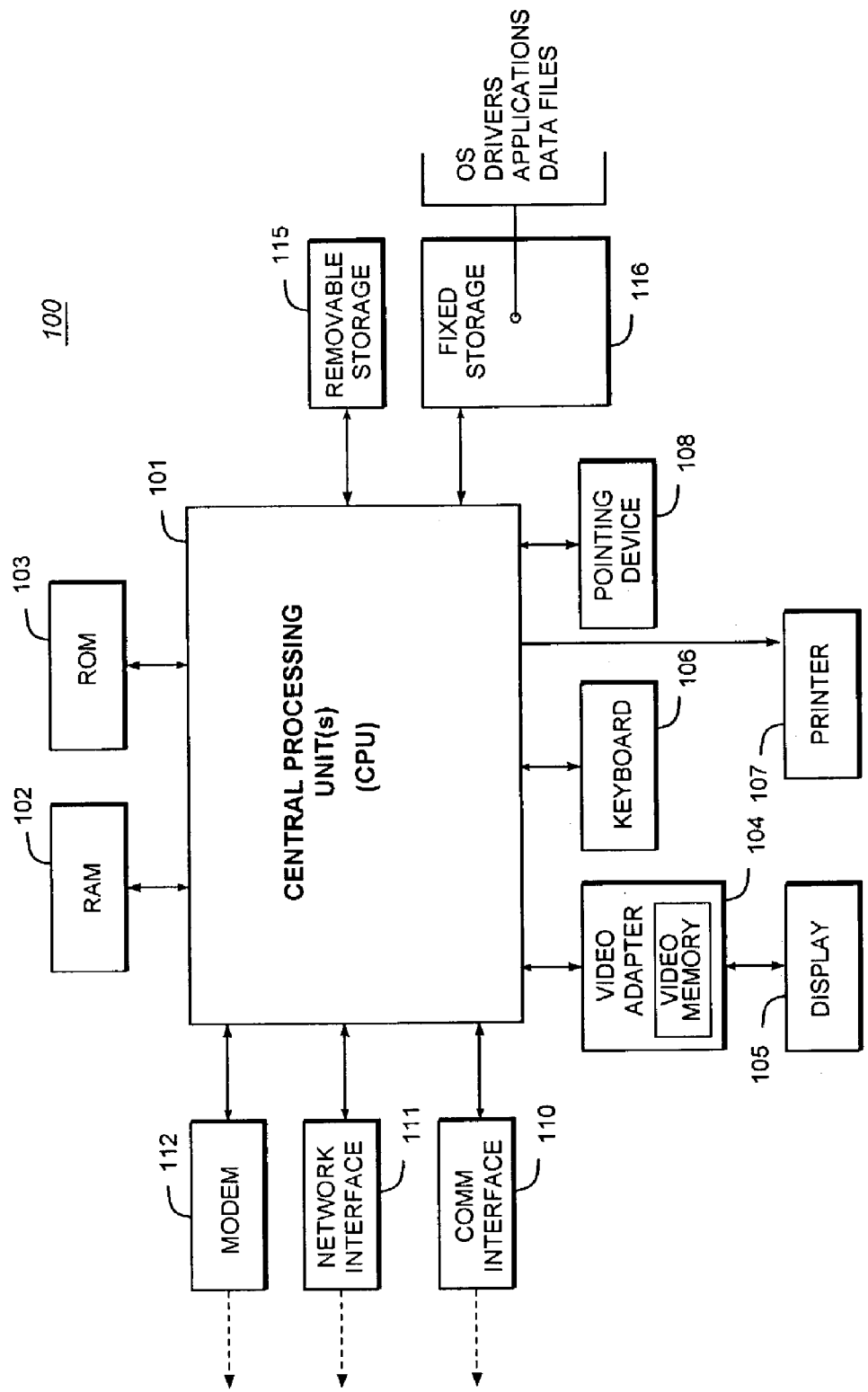
FIG. 1 is a block diagram of a computer system in which software-implemented processes of the present invention may be embodied.

The following definitions are offered for purposes of illustration, not limitation, in order to assist with understanding the discussion that follows.

Checksum: A "checksum" refers generally to a value calculated to uniquely identify a file or group of data items. A checksum is typically calculated by treating the data items as numeric values and using a mathematical (i.e., "hashing") technique (e.g., CRC32 or MD5) to calculate a unique value from the data items. A checksum is frequently stored or transmitted with the group of data items and is widely used for error detection and correction as well as data integrity checking. For example, a checksum value computed on a file requiring protection against manipulation may be stored and later used to determine whether or not the file has been altered or modified.

CRC32 checksum: A "CRC32" or "CRC-32" checksum is a method for calculating a checksum based on a cyclic redundancy check. CRC is an acronym for "cyclic redundancy check" and 32 represents the length of the checksum in bits. A CRC checksum is a number that has been calculated as a function of a message or other group of data (e.g., input data which usually is any sequence of bytes). The cyclic redundancy check is one of the most widely used techniques for error detection in data communications and is often used to protect blocks of data (i.e., frames) that are being transmitted between machines. Using the CRC technique, the transmitter appends an extra n-bit sequence (i.e., a checksum) to every frame.

The checksum contains information about the frame that helps the transmitter detect errors in the frame. The CRC operation treats all bit streams as binary polynomials. Given the original frame, the transmitter generates a frame check sequence (FCS or checksum) for that frame. The FCS is generated so that the resulting frame (the cascade of the original frame and the FCS) is exactly devisable by some pre-defined polynomial. This pre-defined polynomial is called the devisor or CRC polynomial. For further information regarding CRC and CRC32, see e.g., Williams, R., "CRC Explained: A Painless Guide to CRC Error Detection Algorithms", Version 3, August 1993, the disclosure of which is hereby incorporated by reference.

MD5: MD5 is a message-digest algorithm which takes as input a message of arbitrary length and produces as output a 128-bit "fingerprint" or "message digest" of the input. The MD5 technique is used primarily in digital signature applications, where a large file must be "compressed" in a secure manner before being encrypted with a private (secret) key under a public-key cryptosystem. Further description of MD5 is available in "RFC 1321: The MD5 Message-Digest Algorithm", (April 1992), the disclosure of which is hereby incorporated by reference.

Introduction

The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
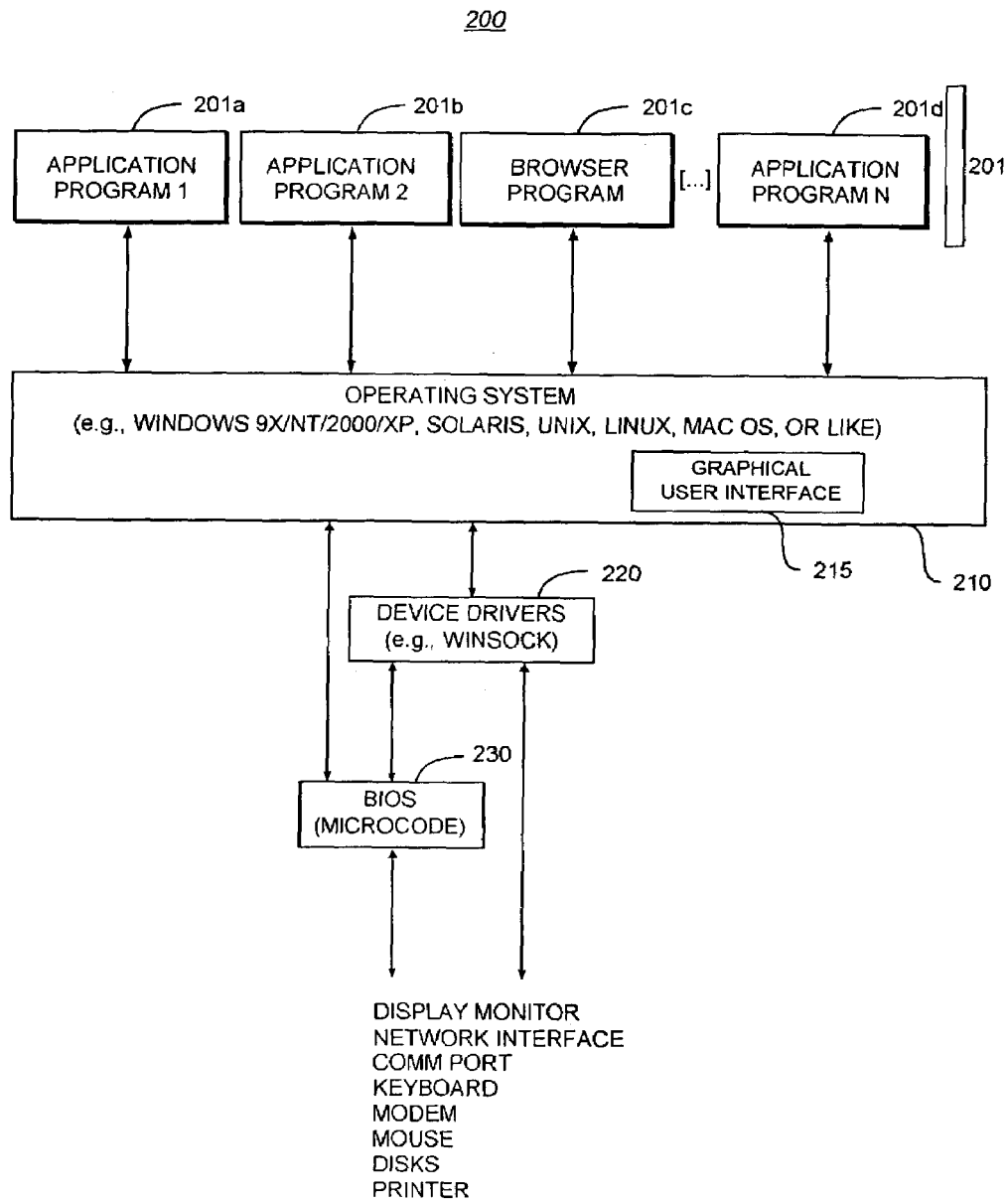
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 11 6, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash.

Alternatively, OS 210 can also be an alternative operating system, such as the previously mentioned operating systems.

The above described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview

The present invention comprises a system providing methodology for computing a checksum on an executable file (e.g., program, driver, data file, loadable library, or the like) in order to uniquely identify that file across different machines. In accordance with the present invention, a "skimp" method (e.g., an original "SkimpFromFile" function or an improved "SkimpFromFile" function and associated routines as described below) is employed to provide a filter so that the checksum is performed on portions of a file of interest, rather than the entire file. In the particular case of an executable file (e.g., application or loadable library) running under the Microsoft Windows operating environment, the sections of the file that are filtered from checksum computation include the file's import information (or section). This import section primarily includes a file's import address tables.

To understand the foregoing approach, it is helpful to briefly review Microsoft's Portable Executable (PE) format. Win32-based executable (image) files are structured according to Microsoft's Portable Executable (PE) format. PE images are produced by a compatible Win32 linker, such as the one provided by Microsoft Developer Studio. For a given executable file, at install time the file's PE image is bound to the operating system configuration of the target machine. During this binding process (i.e., invocation of Windows "BindImage" API call), the file's import address tables are overwritten with the addresses of DLL (dynamic link library) versions found on that particular target machine. The tables allow the executable file to quickly locate DLLs by associating each DLL with a memory location where that particular DLL may be found at runtime. Thus, the import address tables function as "fixup hints" or precalculations that indicate where DLLs required by a particular file are (or will be) located in memory.

Between different machines, the binding for a given file may be drastically different, especially when encountering different versions of the operating system (OS). For example, the binding of Microsoft Outlook on a machine running the Windows 95 OS is drastically different than the binding of Microsoft Outlook on a machine running the Windows 2000 OS. On both machines, the size of a particular version of Microsoft Outlook will be the same (e.g., 700 kilobytes). However, an ordinary checksum (for example, a checksum calculated using MD5) between a given version of Microsoft Outlook running on Windows 95 and also running on Windows 2000 will be different, unless one takes steps to filter out the portions of the executable file or loadable library that have changed during installation. By excluding or zeroing out the checksum calculation for these changing sections, the present invention allows determination of a canonical form that is uniquely identified across different machines.

System Operations

Figure 3:
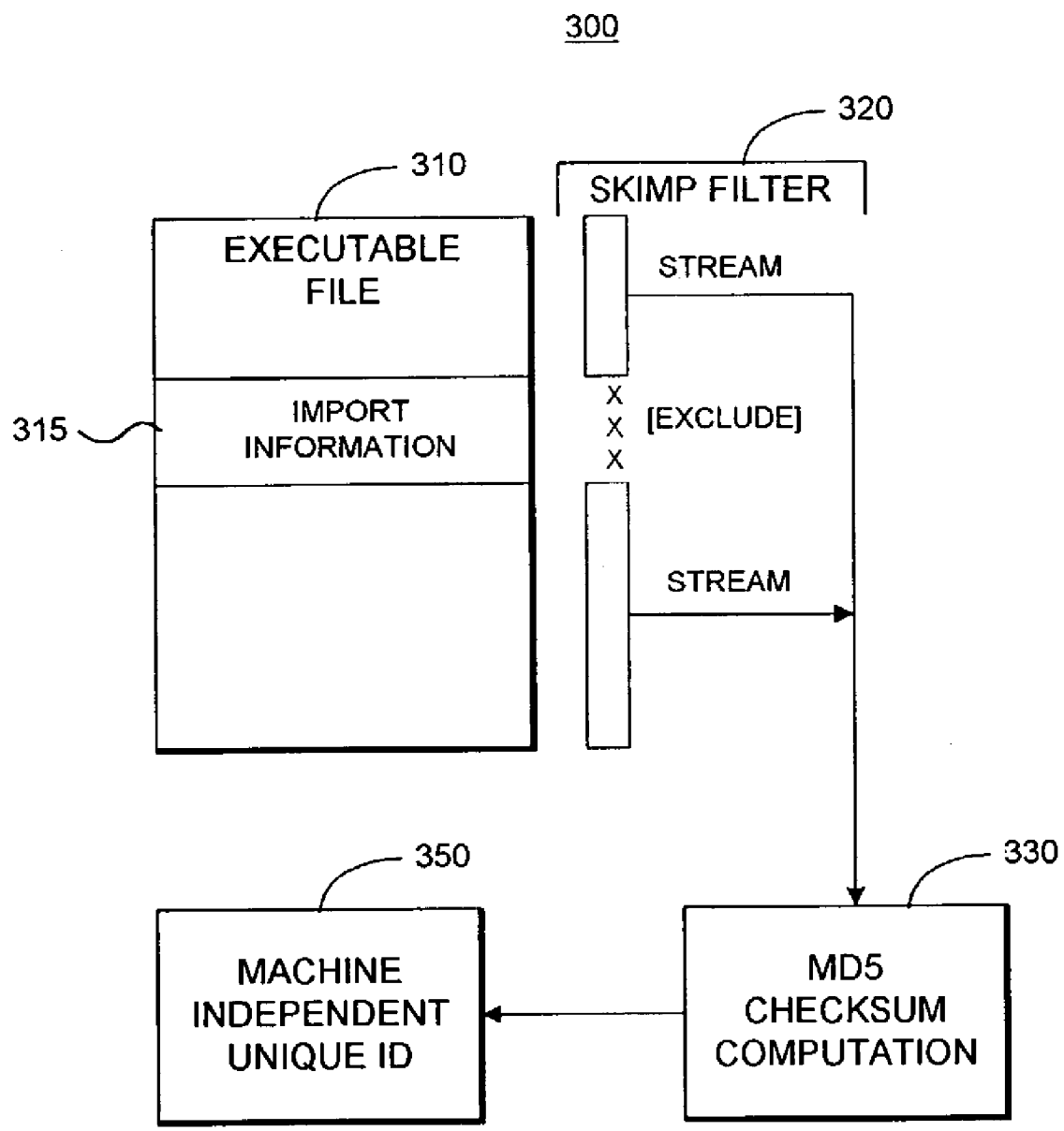
FIG. 3 is a block diagram illustrating the operations of the system of the present invention in computing a machine independent unique identifier for an executable file.

FIG. 3 is a block diagram 300 illustrating the operations of the system of the present invention in computing a machine independent unique identifier for an executable file (e.g., program, driver, data file, loadable library, or the like). The system and methodology of the present invention may be used in a number of different security systems, such as the security system described in commonly-owned U.S. Pat. No. 5,987,611, entitled "System and Methodology for Managing Internet access on a per Application basis for Client Computers Connected to the Internet," the disclosure of which is hereby incorporated by reference. Alternatively, the system and methodology of the present invention may be used in other types of systems or as a standalone system, as desired. The following discussion uses the example of an executable file running on the Windows operating environment for illustrative purposes. However, the present invention is not limited to any particular environment or device configuration.

As shown, an executable file 310 (e.g., program, driver, data file, loadable library, or the like) that is of interest includes import information 315. The import information 315 includes import address tables for the executable file 310. In operation, a checksum is computed (e.g., using an MD5 checksum computation as shown at block 330) on successive blocks or packets in a series or stream of bytes from the executable file 310.

During this process, the system of the present invention employs a "skimp" method providing a skimp filter 320 so that the checksum is performed on portions of the file of interest, rather than the entire file. In the particular case of this exemplary executable file 310 which is running under the Microsoft Windows operating environment, the import information 315 portion of the executable file 310 is filtered from the stream of bytes before the checksum computation is performed at block 330. As described in more detail below, the "skimp" method indicates which portions of the executable file 310 should pass through the filter 320. In a preferred embodiment, the method includes flags describing the portions of the executable file 310 that the MD5 checksum will receive for performing checksum computations. For instance, in an exemplary embodiment operating under Microsoft Windows (file system), the skimp filter 320 will pass all information from the executable file 310 to the checksum computation 330 except for the import information 315 as shown at FIG. 3. In an alternative embodiment for installation on a variety of operating systems, two processing functions are called by an improved "SkimpFromFile" method to process a target executable file. The first of these functions delineates the filtered regions of the target file. The second function fills the delineated (filtered) regions of the file with constant data (zeroes) before passing the data blocks of the target file to the checksum method.

After a skimp filter 320 is applied as described above, at block 330 a checksum is computed (e.g., using an MD5 checksum operation) on successive blocks or packets in a series or stream of bytes from the executable file 310. Each time the checksum is computed (i.e., for a given block or packet of bytes), the computed checksum is added to the prior result. The process of calculating a checksum continues until the end of the executable file 310 is reached in order to compute a machine independent unique ID (or checksum) for the file as illustrated a block 350. This final result may now be used as a unique signature for the file that is suitable for use across different machines. The methods of operation of the present invention will be described next.

Methods of Operation

Figure 4:
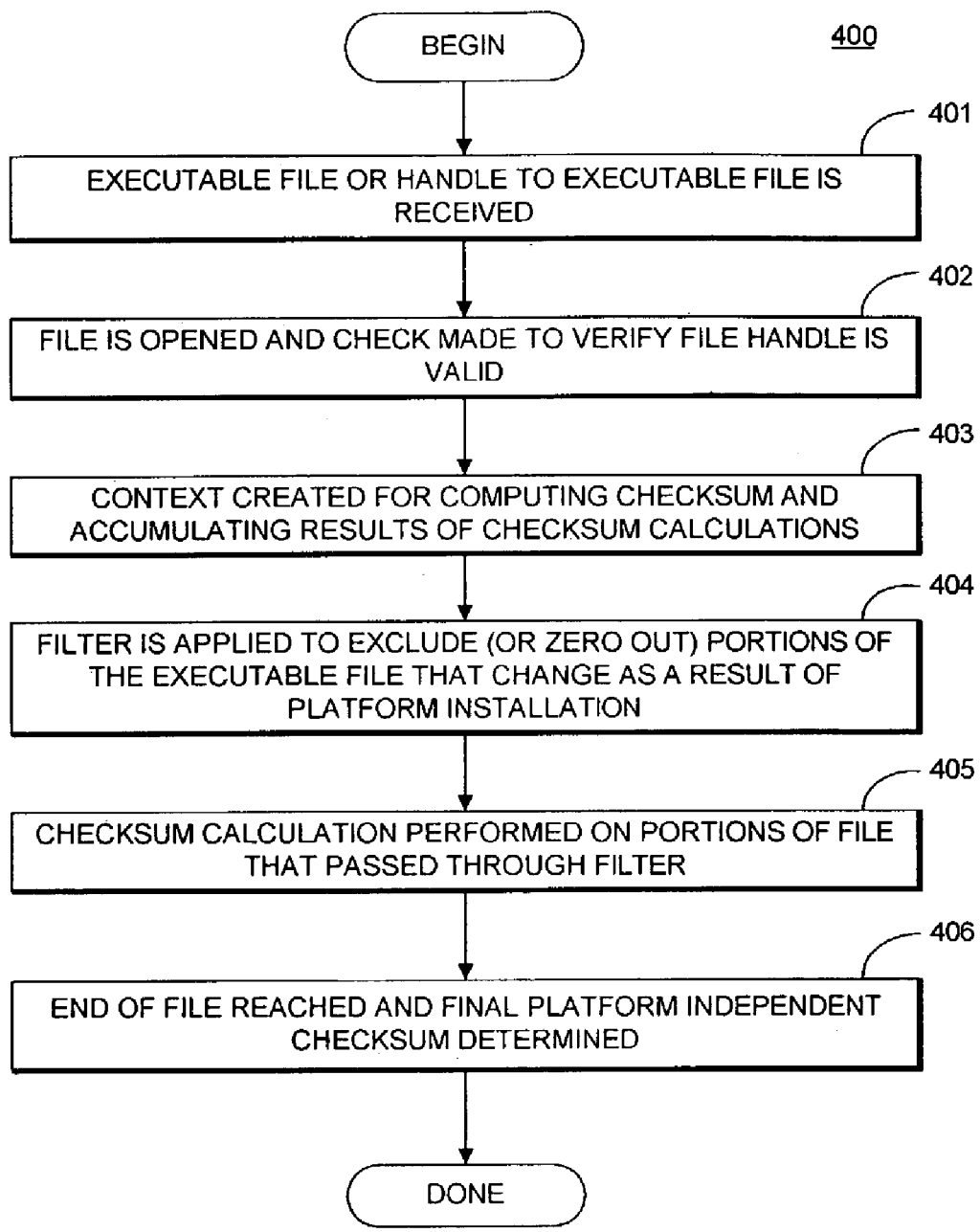
FIG. 4 is a flowchart illustrating the high-level methods of operation of the system of the present invention in computing a checksum on an executable file in order to uniquely identify that file across different machines.

FIG. 4 is a flowchart 400 illustrating the high-level methods of operation of the system of the present invention in computing a checksum on an executable file in order to uniquely identify that file across different machines. The following discussion uses the operations of the system of the present invention in a Microsoft Windows operating environment as an example; however, a similar approach may also be used in other operating environments. The following description presents methodology that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

The method commences at step 401 with the receipt of a file (or file handle) to a given executable file (e.g., program, driver, data file, loadable library, or the like). At step 402 the file that is of interest is opened (e.g., using a Windows "CreateFile" API call to obtain a file handle) and error checking is performed to ensure that the file handle returned for the opened file is valid. At step 403 a context is created for computing a checksum (e.g., an MD5 checksum) on the executable file. The context is used for accumulating the results of checksum calculations.

Next, at step 404 a filter is applied to indicate portions of the file that are of interest for purposes of checksum calculations. The filer is applied so that the checksum calculation is performed on portions of the file, rather than the entire file. Filtering (or zeroing out) portions of the executable file that change as a result of installation of the file on a particular platform (machine) enables a machine-independent checksum to be calculated as hereinafter described. For example, in a preferred Microsoft Windows embodiment, the import information for the file is excluded by excluding the flag "IMAGE_DIGEST_ALL_IMPORT_INFO" so that the operating system returns all information for the file except for import information.

At step 405 a checksum calculation is performed (e.g., using MD5) on the portions of the file that passed through the filter (including those zeroed out by filter, if applicable). In operation, the checksum is computed on successive blocks or packets from a series or stream of bytes. Each time the checksum is computed (i.e., for a given block or packet of bytes), the computed checksum is added to the context created at step 403. At step 406, when the end of the file is reached the context contains the final checksum (e.g., MD5 message digest) for the file. The final checksum or message digest represents a machine-independent unique identifier for the file. In other words, the checksum for the file is calculated after excluding (or zeroing out) portions of the file (e.g., import sections) that are platform dependent. The final checksum or message digest may now be used by the system as a unique signature for the file that is suitable for use across different machines. The operations of the present invention in two alternative embodiments will now be described in greater detail.

Detailed Operation

SkimpFromFile

One embodiment of the present invention may be embodied in a "SkimpFromFile" method shown below.

```
 1: BOOL __stdcall SkimpFromFile (char * fileName,
unsigned char *pDigest)
 2: {
 3: MD5_CTX md5Context;
 4: SKIMP_CTX skimpContext;
 5:
 6: HANDLE hFile = CreateFile(fileName, GENERIC_READ, FILE
SHARE_READ, NULL, OPEN_EXISTING,
FILE_ATTRIBUTE_NORMAL, 0);
 7:
 8: if (hFile = = INVALID_HANDLE_VALUE)
 9: return FALSE;
10:
11: MD5Init (&mdSContext)
12:
13: skimpContext.pCTX = &mdSContext;
14: skimpContext.dwFileSize = GetFileSize(hFile, 0);
15:
16: ImageGetDigestStream(hFile, CERT_PH_IMAGE_DIGEST_DEBUG
INFO | CERT_PH_IMAGE_DIGEST_RESOURCES |
CERT_PH_IMAGE_DIGEST_NON_PE_INFO,
(DIGEST_FUNCTION)&UpdateSkimpDigest,
(DIGEST_HANDLE) &skimpContext);
17:
18: MD5Final(pDigest, &md5Context) CloseHandle (hFile);
return TRUE;
19: }
```

The above "SkimpFromFile" method is invoked with a filename (complete path) of the file to check, plus a (pointer to) buffer for writing a corresponding message digest (checksum). At lines 3–4, the method declares local variables. At line 6, the method opens the file of interest. For example, under Microsoft Windows, the method invokes the Windows "CreateFile" API call to open the file; a Windows file handle is obtained as a result of the call. At lines 8–9, the method performs error checking to test that the file handle returned for the opened file is valid.

At line 11, the method invokes an MD5Init function, which is an initialization call to an MD5 library (e.g., provided by RSA Data Security, Inc.). This initialization call sets up the necessary structure for calculating an MD5 checksum on relevant portions of the file (i.e., net of the skimp filter). At lines 13–14, the method creates a "skimp" context. The skimp context is a structure that stores two items: (1) an MD5 context, and (2) file size. The MD5 context is used for computing an MD5 checksum. The context is a byte array (buffer) used for accumulating the results of checksum operations. In operation, a checksum is computed on successive blocks or packets from a series or stream of bytes. Each time the checksum is computed (i.e., for a given block or packet of bytes), the computed checksum is added to (e.g., XOR'ed into) the MD5 context. In this manner, the MD5 context allows computation of a final checksum (message digest) for a given stream of bytes. The file size tracked by the skimp context is used for defensive programming, to make sure that the method does not attempt to test beyond the end of the file.

At line 16, the method invokes a Windows API call, from the Windows Image Helper API, in order to get a subset (byte stream) of the file that corresponds to the portions (i.e., filtered portions) of the file that are of interest for checksum processing. The invocation occurs as follows. The above "SkimpFromFile" method passes as the first parameter the handle to the file that is to be checked. Next, the method passes a series of flags that indicate portions of the file to pass through the filter (i.e., to allow). In other words, the flags describe the portions of the file that will be used for purposes of calculating the MD5 checksum. In the instance of an embodiment operating under the Microsoft Windows operating system, the approach is to enable all flags except for one. In particular, import information for the file (under the Microsoft Windows operating system) is excluded by excluding the flag "IMAGE_DIGEST_ALL_IMPORT_INFO". This flag configuration will ensure that the operating system returns all information for the file except for import information.

The third parameter passed by the method to the API call is a (pointer to) callback function, "UpdateSkimpDigest". The fourth parameter that is passed is the above described context. "UpdateSkimpDigest" will be called back to receive the blocks of bytes that correspond to the sections of the file that are passed through the filter. "UpdateSkimpDigest" will receive buffers of information from the file except for the information that is desired to be filtered from the checksum computation (i.e., the import information). Accordingly, each time "UpdateSkimpDigest" is called back, it computes an MD5 checksum or digest for that area of the file—that is, the block (buffer) passed during the callback. Recall that the skimp context includes a maximum file size so that the examination of the file can be restricted to not run past the actual end of the file.

UpdateSkimpDigest

The "UpdateSkimpDigest" function represents the callback mechanism employed in the currently preferred embodiment. It may be implemented as follows:

```
1: BOOL WINAPI UpdateSkimpDigest (DIGEST_HANDLE refdata,
PBYTE pData, DWORD dwLength)
2: {
3: if (!pData || !dwLength)
4: return FALSE;
5:
6: if (dwLength > ((SKIMP_CTX*)refdata)->dwFileSize)
7: return TRUE;
8:
9: MD5Update( ((SKIMP_CTX*) refdata) ->pCTX, pData, dwLength);
return TRUE;
10: }
```

The first input parameter to this callback function is a pointer that is recasted to the above described skimp context. The second parameter is the (pointer to) actual byte array of data from the file that will be operated on, and the third parameter is the length of that byte array. At lines 3–4, the function implements defensive programming by testing the validity of the second and third parameters. Lines 6–7 also implement defensive programming by testing that the length (of the byte array) does not exceed the file size (which is available from the skimp context). This in particular addresses the problem of the callback being invoked with a length (parameter) that exceeds the file size.

At line 9, the function invokes "MD5 Update" with the skimp context and the above mentioned byte array and length. This in turn causes the MD5 operation (e.g., available in RSA MD5 library) to be invoked to compute an MD5 message digest or checksum for the then-current block (byte array)—that is, up to that particular point in the file. MD5 is a technique created in 1991 by Professor Ronald Rivest that is used to create digital signatures. MD5 takes as input a message of arbitrary length and produces as output a 128-bit "fingerprint" or "message digest" of the input. MD5 is a one-way hash function, thus making it nearly impossible to derive the original text or data from the message digest. It is intended for use with 32 bit machines and is safer than the MD4 operation which preceded it. Further description of MD5, including an appendix containing Professor Rivest's original implementation is provided in "RFC 1321: The MD5 Message-Digest Algorithm", (April 1992), the disclosure of which is hereby incorporated by reference.

The computed message digest (or checksum) is merged back (e.g., XOR'ed) into the skimp context, as previously described. In practice, the "UpdateSkimpDigest" callback function is invoked about a dozen times for processing a typical file. After the last invocation of the callback function, the skimp context contains the final message digest for the file. The final message digest, which in the currently preferred embodiment is contained within. 32 bytes, represents the MD5 checksum for the file without those portions of the file excluded from the calculation (e.g., import sections or areas). The final message digest may now be used by the system as a unique signature for the just-examined file that is suitable for use across different machines.

Although the currently preferred embodiment employs the RSA MD5 checksum technique, the actual checksum technique employed is not critical to implementing the present invention. Instead, a variety of other checksum techniques may be used, such as CRC32 or the like. What is more important for implementing the present invention is the filtering of different sections or areas of a file from computation of the unique signature (checksum) for a given file.

Alternative Embodiment

ImprovedSkimpFromFlie Function

In an alternative embodiment, a specialized process is used to compute unique checksums which are verifiably identical for installations on a variety of operating systems. This implementation starts with an improved function which takes the same arguments as the original "SkimpFromFile" function described above:

```
1: BOOL WINAPI SkimpFromFile(LPCSTR fileName,
unsigned char *pDigest)
2: {
3:      DWORD dwRead, dwOffset = 0;
4:      BOOL bResult = FALSE;
5:      BYTE buf[BUFFER_SIZE];
6:      MD5_CTX context;
7:      PEImportsParser parser;
8:
9:      HANDLE hFile = CreateFile(fileName, GENERIC_READ,
FILE_SHARE_READ, NULL,
10:         OPEN_EXISTING, FILE_ATTRIBUTE_NORMAL, 0);
11:
12:     if (hFile = = INVALID_HANDLE_VALUE)
13:     return FALSE;
14:
15:     if (parser.ProcessFile(hFile))
16:     {
17:        MD5Init (&context);
18:
19:        while (bResult = ReadFile(hFile, buf,
BUFFER_SIZE, &dwRead, NULL))
20:        {
21:            if (dwRead = = 0)
22:               break;
23:
24:            if (!parser.ZeroImportBlocks(dwOffset,
buf, dwRead))
25:            {
26:               bResult = FALSE;
27:               break;
28:            }
29:
30:            MD5Update(&context, buf, dwRead);
31:
32:            dwOffset += dwRead;
33:        }
34:
35:
36:        if (bResult)
37:           MD5Final(pDigest, &context);
38:     }
39:
40:     CloseHandle(hFile);
41:
42:     return bResult;
43: }
```

This improved "SkimpFromFile" method takes the same arguments as the original function (i.e., a filename of the file to check, plus a (pointer to) buffer for writing a corresponding checksum), and it also makes use of a separate checksum method (i.e., MD5). However, the improved method uses the "PEImportsParser::ProcessFile" and "PEImportsParser::ZeroImportBlocks" functions described below to filter the data being sent to the MD5 checksum method. As shown above at line 15, the first of these two functions is called ("parser.ProcessFile(hFile)") to delineate the filtered regions of the target file. The second of these functions is called as illustrated at line 24 ("parser.ZeroImportBlocks(dwOffset, buf, dwRead)") to fill the filtered regions of the file with constant data (zeroes) before passing the data blocks of the target file to the checksum method. These two functions, together with associated routines called by these functions, are described below.

The ProcessFile Function

The following "ProcessFile" function is called by the improved "SkimpFromFile" method as described above to delineate regions of a target file that are to be filtered:

```
 1: BOOL PEImportsParser::ProcessFile (HANDLE hFile)
 2: {
 3:      // reset if called multiple times
 4:      DeleteAllZimpBlocks( );
 5:
 6:      HANDLE hFileMapping = CreateFileMapping(hFile,
NULL, PAGE_READONLY,
 7:        0, 0, NULL);
 8:      if (hFileMapping = = 0)
 9:        return FALSE;
10:
11:      DWORD dwFileSize = GetFileSize(hFile, NULL);
12:      if (dwFileSize = = INVALID_FILE_SIZE)
13:        return FALSE;
14:
15:      BOOL bResult = FALSE;
16:      PIMAGE_DOS_HEADER pDOSHeader =
17:        (PIMAGE_DOS_HEADER)MapViewOfFile(hFileMapping,
FILE_MAP_READ, 0, 0, 0);
18:      if (pDOSHeader)
19:      {
20:        __try
21:        {
22:          if (pDOSHeader->e_magic = =
IMAGE_DOS_SIGNATURE)
23:          {
24:            PIMAGE_NT_HEADERS pNTHeader =
MakePtr(PIMAGE_NT_HEADERS,
25:              pDOSHeader, (DWORD)pDOSHeader->e_lfanew);
26:
27:            if (((DWORD)pNTHeader <
((DWORD)pDOSHeader + dwFileSize)) &&
28:              (pNTHeader->Signature = =
IMAGE_NT_SIGNATURE))
29:            {
30:
31:              DWORD dwRVA =
GetImgDirEntryRVA(pNTHeader,
32:                IMAGE_DIRECTORY_ENTRY_BOUND_IMPORT);
33:
34:              if (dwRVA)
35:                ProcessBoundImports
(pNTHeader, dwRVA, pDOSHeader);
36:
37:              dwRVA = GetImgDirEntryRVA (pNTHeader,
38:                IMAGE_DIRECTORY_ENTRY_IAT);
39:
40:              if (dwRVA)
41:                ProcessIAT(pNTHeader, dwRVA);
42:
43:              dwRVA = GetImgDirEntryRVA(pNTHeader,
44:                IMAGE_DIRECTORY_ENTRY_IMPORT);
45:
46:              if (dwRVA)
47:                ProcessImports(pNTHeader, dwRVA, pDOSHeader);
48:
49:              // Did we process anything?
50:              // If not, don't bother zeroing the headers
51:              if (m_pBlocks)
52:              {
53:                // Extra insurance for removing debug
info for bound imports
54:                dwRVA =((DWORD)IMAGE_FIRST_SECTION(pNTHeader)
- (DWORD)pDOSHeader) +
55:                  (pNTHeader->FileHeader.NumberOfSections
* sizeof(IMAGE_SECTION_HEADER));
56:                if (pNTHeader->
OptionalHeader.SizeOfHeaders > dwRVA)
57:                  AddZimpBlock(dwRVA, pNTHeader->
OptionalHeader.SizeOfHeaders - dwRVA);
58:
59:                AddZimpBlock(pDOSHeader,
60:                  &pNTHeader->OptionalHeader.SizeOfHeaders,
```

-continued
```
61:                 sizeof(pNTHeader->
OptionalHeader.SizeOfHeaders));
62:
63:             AddZimpBlock(pDOSHeader,
64:                 &pNTHeader->OptionalHeader.Checksum,
65:                 sizeof(pNTHeader->
OptionalHeader.Checksum));
66:
67:             AddZimpBlock(pDOSHeader,
68:                 &pNTHeader->OptionalHeader.DataDirectory[
69:                     IMAGE_DIRECTORY_ENTRY_IMPORT],
70:                     sizeof(IMAGE_DATA_DIRECTORY));
71:
72:             AddZimpBlock(pDOSHeader,
73:                 &pNTHeader->OptionalHeader.DataDirectory[
74:
75:                     IMAGE_DIRECTORY_ENTRY_BOUND_IMPORT],
76:                     sizeof(IMAGE_DATA_DIRECTORY));
77:
78:             AddZimpBlock(pDOSHeader,
79:                 &pNTHeader->OptionalHeader.DataDirectory[
80:                     IMAGE_DIRECTORY_ENTRY_IAT],
81:                     sizeof(IMAGE_DATA_DIRECTORY));
82:             }
83:         }
84:     }
85:     bResult = TRUE;
86: }
87:     __except (EXCEPTION_EXECUTE_HANDLER)
88:     {
89:         DeleteAllZimpBlocks( );
90:         SetLastError(ERROR_BAD_EXE_FORMAT);
91:     }
92:     UnmapViewOfFile(pDOSHeader);
93:     }
94:     CloseHandle(hFileMapping);
95:
96:     return bResult;
97: }
```

The above "ProcessFile" function prepares a list of filterable ranges to be used by the "PEImportsParser::ZeroImportBlocks" function. As illustrated at lines 1–30 above, the target file is loaded into memory and a check is made to verify that it is an executable file. Filterable ranges in the target file are then identified by reading and processing the bound imports ("BoundImports") as shown at lines 31–35; reading and processing the import address table as provided at lines 37–41 reading and processing the import tables as shown at lines 43–47; and reading and processing portions of the file header at lines 51–82. The processing of the bound imports of the target file includes a call to a "PEImportsParser::ProcessBoundImports" function at line 35 above. In addition, at line 41 a call is made to the below "PEImportsParser::ProcessIAT" function. Similarly, at line 47 a call is made to the below "PEImportsParser::ProcessImports" function. One or more calls to a "PEImportsParser::AddZimpBlock" function may also be made to process portions of the header file (e.g., as provided at line 72 above). These four functions that are called by the above "ProcessFile" function to mark portions of the target file eligible for filtering out of the checksum calculations are illustrated below.

ProcessBoundImports Function

```
1: void PEImportsParser::ProcessBoundImports(PIMAGE_NT_HEADERS
2:             pNTHeader, DWORD dwRVA, PVOID pBase)
3: {
4:     DWORD dwSize = GetImgDirEntrySize(pNTHeader,
5:         IMAGE_DIRECTORY_ENTRY_BOUND_IMPORT);
6:
7:     // Dirty bind.
8:     if ((pNTHeader->OptionalHeader.SizeOfHeaders > dwSize) &&
9:         (pNTHeader->OptionalHeader.SizeOfHeaders > dwRVA))
10:         dwSize = pNTHeader->OptionalHeader.SizeOfHeaders
- dwRVA;
11:
12:     AddZimpBlock(dwRVA, dwSize);
13:
14:         PIMAGE_BOUND_IMPORT_DESCRIPTOR pBoundImportDesc =
15:             MakePtr(PIMAGE_BOUND_IMPORT_DESCRIPTOR,
pBase, dwRVA);
16:
```

```
17:     while (pBoundImportDesc->TimeDateStamp)
18:     {
19:         AddZimpBlock(pBase, pBoundImportDesc,
20:             sizeof(IMAGE_BOUND_IMPORT_DESCRIPTOR));
21:         PIMAGE_BOUND_FORWARDER_REF pBoundForwardRef =
22:             MakePtr(PIMAGE_BOUND_FORWARDER_REF,
23:             pBoundImportDesc,
sizeof(IMAGE_BOUND_IMPORT_DESCRIPTOR));
24:
25:         for (int i = 0; i < pBoundImportDesc->
NumberOfModuleForwarderRefs; i++)
26:         {
27:             AddZimpBlock(pBase, pBoundForwardRef,
28:                 sizeof(IMAGE_BOUND_FORWARDER_REF));
29:
30:             pBoundForwardRef ++; // advance to
next forwarder ref
31:
32:             // Keep the outer loop pointer up to date too
33:             pBoundImportDesc =
MakePtr(PIMAGE_BOUND_IMPORT_DESCRIPTOR,
34:             pBoundImportDesc,
sizeof(IMAGE_BOUND_FORWARDER_REF));
35:
36:             AddZimpBlock (pBase, pBoundImportDesc,
37:                 sizeof(IMAGE_BOUND_IMPORT_DESCRIPTOR));
38:         }
39:
40:         pBoundImportDesc++;
41:     }
42: }
```

The above "ProcessBoundImports" function reads the bound imports table from the executable file and marks all portions of this table and the table's references as eligible for filtering out of the checksum. In particular, it marks unallocated portions of the bound imports table which might have been left unbound in the installation process (a so-called "dirty-bind").

ProcessIAT Function

```
1: void PEImportsParser::ProcessIAT
(PIMAGE_NT_HEADERS
pNTHeader, DWORD dwRVA)
2: {
3:      DWORD dwSize =
GetImgDirEntrySize(pNTHeader,
IMAGE_DIRECTORY_ENTRY_IAT);
4:      AddZimpBlock(dwRVA, dwSize);
5: }
```

This "ProcessIAT" function marks the entire import address table from the target file as eligible for being filtered out of the stream provided to the checksum calculator.

ProcessImports Function

```
1: void PEImportsParser::ProcessImports(PIMAGE_NT_HEADERS
2:          pNTHeader, DWORD dwRVA, PVOID pBase)
3: {
4:      PIMAGE_IMPORT_DESCRIPTOR pImportDesc;
5:      PIMAGE_THUNK_DATA pThunk, pThunkIAT;
6:      PIMAGE_IMPORT_BY_NAME pOrdinalName;
7:      char * pName;
8:
9:      DWORD dwSize = GetImgDirEntrySize(pNTHeader,
IMAGE_DIRECTORY_ENTRY_IMPORT);
10:     AddZimpBlock(dwRVA, dwSize);
11:
12:     pImportDesc =
(PIMAGE_IMPORT_DESCRIPTOR)GetPtrFromRVA(pNTHeader,
13:         dwRVA, pBase);
14:
15:     while ((pImportDesc->TimeDateStamp != 0) ||
(pImportDesc->Name != 0))
16:     {
17:         // Usually this would be mean we need to break, but
18:         // we need work around the Borland's tlink issue
19:         if (pImportDesc->Characteristics = = 0)
```

```
20:             {
21:                 // Ok, this is really 0 terminated descriptor
22:                 if (pImportDesc->FirstThunk = = 0)
23:                     break;
24:
25:                 pThunk =
(PIMAGE_THUNK_DATA)GetPtrFromRVA(pNTHeader,
26:                     pImportDesc->FirstThunk, pBase);
27:             }
28:             else
29:                 pThunk = (PIMAGE_TRUNK_DATA) GetPtrFromRVA
(pNTHeader,
30:                     pImportDesc->Characteristics, pBase);
31:
32:
33:             pThunkIAT = (PIMAGE_THUNK_DATA)GetPtrFromRVA
(pNTHeader,
34:                 pImportDesc->FirstThunk, pBase);
35:
36:             AddZimpBlock(pBase, pImportDesc,
sizeof(IMAGE_IMPORT_DESCRIPTOR));
37:
38:             pName = (char *)GetPtrFromRVA(pNTHeader,
39:                 (DWORD)pImportDesc->Name, pBase);
40:             AddZimpBlock(pBase, pName, strlen(pName) + 1);
41:
42:             while (pThunk->u1.AddressOfData != 0)
43:             {
44:                 if (!(pThunk->u1.Ordinal & IMAGE_ORDINAL_FLAG))
45:                 {
46:                     pOrdinalName =
(PIMAGE_IMPORT_BY_NAME)GetPtrFromRVA(pNTHeader,
47:                         (DWORD)pThunk->u1.AddressOfData, pBase);
48:
49:                     AddZimpBlock(pBase, pOrdinalName,
sizeof(IMAGE_IMPORT_BY_NAME));
50:                     AddZimpBlock(pBase, pOrdinalName->Name,
51:                         strlen((const char *)pOrdinalName->
Name) + 1);
52:                 }
53:
54:                 AddZimpBlock(pBase, pThunk,
sizeof(IMAGE_THUNK_DATA));
55:
56:                 // Add this in case it exceeds the
IAT size, it happens
57:                 AddZimpBlock(pBase, pThunkIAT,
sizeof (IMAGE_THUNK_DATA));
58:
59:                 pThunk++;
60:                 pThunkIAT++;
61:             }
62:
63:             pImportDesc++;
64:     }
65: }
```

The above "ProcessImports" function marks the import table of the target file, and import references related to the table, as eligible for filtering out from the checksum calculation. This function also identifies areas of the file which may be left improperly initialized by particular linker vendors, which would cause other checksum calculation methods and filters to compute distinct (and therefore non-identifying) checksums.

AddZimpBlock

```
1: void PEImportsParser::AddZimpBlock(DWORD dwOffset,
    DWORD dwSize)
2: {
3:     if (dwSize == 0)
4:         return;
```

```
5:
6:     ZimpBlock ** ppLast = &m_pBlocks;
7:     DWORD dwLastEnd, dwEnd;
8:
9:     while ((*ppLast) != NULL)
10:    {
11:        dwLastEnd = (*ppLast)->dwOffset +
(*ppLast)->dwSize;
12:        dwEnd = dwOffset + dwSize;
13:
14:        // Is there an intersection?
15:        if (((dwOffset >= (*ppLast)->dwOffset) &&
(dwOffset <= dwLastEnd)) ||
16:            (((*ppLast)->dwOffset >= dwOffset) &&
((*ppLast)->dwOffset <= dwEnd)))
17:        {
```

```
 18:
 19:             // Need to adjust the offset?
 20:             if (dwOffset < (*ppLast)->dwOffset)
 21:             {
 22:                     (*ppLast)->dwSize += (*ppLast)->
 dwOffset - dwOffset;
 23:                     (*ppLast)->dwOffset = dwOffset;
 24:
 25:             }
 26:
 27:             if (dwEnd > dwLastEnd)
 28:                     MergeZimpBlocks(*ppLast, dwEnd);
 29:
 30:             return;
 31:         }
 32:
 33:
 34:         // Here's the insertion point
 35:         if (dwLastEnd > dwOffset)
 36:             break;
 37:
 38:         ppLast = &((*ppLast)->pNext);
 39:     }
 40:
 41:     ZimpBlock * pTemp = new ZimpBlock;
 42:     pTemp->dwOffset = dwOffset;
 43:     pTemp->dwSize = dwSize;
 44:     pTemp->pNext = *ppLast;
 45:     (*ppLast) = pTemp;
 46:}
```

The "AddZimBlock" function appends a range of bytes (denoted by the "dwoffset" and "dwSize" values) from the target executable file to a linked list of bytes which should not be included in the checksum calculation for the file. In the preferred embodiment, this function keeps this list sorted in order of offset, and also merges adjacent range blocks to reduce memory consumption and increase computational performance.

ZeroImportBlocks Function

```
 1: BOOL PEImportsParser::ZeroImportBlocks(DWORD
 dwFileOffset, PVOID pBuf,
 2:             DWORD dwBufSize, BOOL bZeroOnce = TRUE)
 3: {
 4:     ZimpBlock * pLast, * pTemp = m_pBlocks;
 5:     DWORD dwIndex, dwLength, dwEnd, dwTempEnd;
 6:
 7:     ___try
 8:     {
 9:         while (pTemp != NULL)
10:         {
11:             dwEnd = dwFileOffset + dwBufSize;
12:
13:             // break out early if blocks comes after
the buffer
14:             if (pTemp->dwOffset > dwEnd)
15:                 break;
16:
17:             dwTempEnd = pTemp->dwOffset + pTemp->dwSize;
18:
19:             // Did this rollover?
20:             if (dwTempEnd < pTemp->dwOffset)
21:             {
22:                 SetLastError(ERROR_BAD_EXE_FORMAT);
23:                 return FALSE;
24:             }
25:
26:             //Is there an intersection with pBuf
27:             if ((dwTempEnd > dwFileOffset) &&
(pTemp->dwOffset < dwEnd))
28:             {
29:                     // default for blocks that started
before the buffer
30:                     dwIndex = 0;
31:
32:                     // if block starts in buffer, get
relative index
33:                     if (pTemp->dwOffset > dwFileOffset)
34:                         dwIndex = pTemp->dwOffset -
dwFileOffset;
35:
36:                     // assume full blocks fits in this buffer
37:                     dwLength = pTemp->dwSize;
38:
39:                     // if block exceed buffer, trim length
40:                     if (dwTempEnd > dwEnd)
41:                         dwLength = dwBufSize - dwIndex;
42:                     // else if block start before buffer AND
block not exceeding buffer
43:                     else if (pTemp->dwOffset < dwFileOffset)
44:                         dwLength = pTemp->dwSize -
(dwFileOffset - pTemp->dwOffset);
45:
46:                     ZeroMemory((PVOID)((DWORD) pBuf +
dwIndex), dwLength);
47:             }
48:
49:             // Can we delete the block now?
50:             if ((bZeroOnce) && (dwTempEnd <=
(dwFileOffset + dwBufSize)))
51:             {
52:                 pLast = pTemp;
53:                 pTemp = pTemp->pNext;
54:                 DeleteZimpBlock(pLast);
55:             }
56:             else
57:                 pTemp = pTemp->pNext;
58:         }
59:         return TRUE;
60:     }
61:     ___except (EXCEPTION_EXECUTE_HANDLER)
62:     {
63:         SetLastError(ERROR_BAD_EXE_FORMAT);
64:         return FALSE;
65:     }
66: }
```

The above "ZeroImportBlocks" function is a stream filter function which takes as input a buffer of data, which was read in sequence from the target executable file, and which erases (changes to zero values) the data in selected ranges of those bytes which are specified in the identified list of filterable ranges. The identified list of filterable ranges is indicated by previous processing steps (i.e., during the processing of the target file by the above described "ProcessFile" function).

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

The invention claimed is:

1. A method for detecting unauthorized modifications to an executable file that is capable of operating on a number of platforms, the method comprising:
receiving a request, at a given machine that the executable file has been installed on, to derive a machine independent unique identifier for the executable file that uniquely identifies the executable file across a number of platforms;

identifying portions of the executable file modified as a result of installation of the executable file on the given machine, so that those portions of the executable file that comprise machine-specific modifications can be excluded during calculation of the machine independent unique identifier;

deriving the machine independent unique identifier by performing a calculation on remaining portions of the executable file, such that said calculation excludes at least the identified portions of the executable file modified as a result of installation of the executable file on the given machine; and detecting future unauthorized modifications to the executable file regardless of which platform the executable file is installed on using the machine independent unique identifier to test whether the executable file has changed.

2. The method of claim 1, wherein said executable file comprises a computer program.

3. The method of claim 1, wherein said executable file comprises a loadable library.

4. The method of claim 1, wherein said executable file comprises a driver.

5. The method of claim 1, wherein said identifying step includes identifying import information in the executable file.

6. The method of claim 1, wherein said identifying step includes identifying at least one import table in the executable file.

7. The method of claim 6, wherein said at least one import table includes a bound import table.

8. The method of claim 6, wherein said at least one import table includes an import address table.

9. The method of claim 1, wherein said deriving step includes substituting a zero value for portions of the executable file determined to be modified as a result of installation on the given machine.

10. The method of claim 1, wherein said deriving step includes performing the calculation only on portions of the executable file determined not to be modified as a result of installation.

11. The method of claim 1, wherein said deriving step includes excluding import information from the calculation.

12. The method of claim 1, wherein the calculation on the executable file comprises a checksum calculation.

13. The method of claim 1, wherein said deriving step includes using an MD5 technique.

14. The method of claim 1, wherein said deriving step includes using a cyclic redundancy check technique.

15. A computer-readable medium having computer-executable instructions for performing the method of claim 1.

16. A downloadable set of computer-executable instructions for performing the method of claim 1.

17. A method for calculating a fingerprint for a program capable of operating on a plurality of platforms in order to detect unauthorized modifications to the program regardless of which platform the program is currently installed, the method comprising:

receiving a request to calculate a fingerprint for a program installed on a particular computer, said program capable of operating on a plurality of different platforms, said program comprising segments having platform-specific features and segments without platform-specific features;

identifying the segments of the program without platform-specific features, so that those segments of the program having platform-specific features can be excluded during calculation of the fingerprint; and calculating the fingerprint for the program based on the segments of the program identified to be without platform-specific features, such that the fingerprint is calculated without the segments of the program that have platform-specific feature; wherein future unauthorized modifications to the program are detected regardless of which platform the program is installed on, using the calculated fingerprint to test whether the program has changed.

18. The method of claim 17, wherein said program comprises an executable file.

19. The method of claim 17, wherein said program comprises a loadable library.

20. The method of claim 17, wherein said calculating step includes replacing all segments of the program that have platform-specific features with a constant value.

21. The method of claim 20, wherein said constant value is zero.

22. The method of claim 17, wherein said calculating step includes using an MD5 technique.

23. The method of claim 17, wherein said calculating step includes using a cyclic redundancy check technique.

24. The method of claim 17, wherein said fingerprint is calculated by a security system for use in detecting modifications to the program.

25. A computer-readable medium having computer-executable instructions for performing the method of claim 17.

26. A downloadable set of computer-executable instructions for performing the method of claim 17.

27. In a computer system where files may themselves receive platform-specific modifications during installation in order to optimize execution of files on the computer system, a method for generating a unique signature for a file that has been installed in order to detect future unauthorized modifications to the file regardless of which platform the file is installed on, the method comprising:

installing the file on a particular machine, whereupon certain portions of the file undergo modifications during installation in order to optimize execution of the file on the particular machine;

examining the file to determine portions of the file that are unmodified during installation of the file on the particular machine, so that those portions of the file that comprise platform-specific modifications associated with the particular machine can be later ignored when attempting to detect subsequent unauthorized modifications to the file;

generating a unique signature for the file based on the portions of the file determined to have been unmodified during installation, so that the unique signature is generated without taking into account those portions of the file that have been modified during installation; and detecting future unauthorized modifications to the file regardless of which platform the file is installed on, using the unique signature to detect modifications to portions of the file that had been left unmodified during installation.

28. The method of claim 27, wherein said file comprises an executable file.

29. The method of claim 27, wherein said file comprises a loadable library.

30. The method of claim 27, wherein said file comprises a computer program.

31. The method of claim 27, wherein said examining step includes determining portions of the file comprising import information.

32. The method of claim 27, wherein said unique signature is used by a security system for file integrity checking.

33. The method of claim 27, wherein said unique signature is used for determining file identity across different machines.

34. The method of claim 27, wherein said method for generating a unique signature is provided as part of a security system.

35. The method of claim 27, wherein said step of generating a unique signature includes substituting a zero value for portions of the file that have been modified during installation.

36. The method of claim 27, wherein said step of generating a unique signature includes performing a checksum calculation on portions of the file determined to have been unmodified during installation.

37. The method of claim 27, wherein said step of generating a unique signature includes calculating a message digest for the file.

38. The method of claim 37, wherein calculating a message digest for the file includes using an MD5 technique.

39. In a security system, a method for detecting unauthorized modifications to an executable file that is capable of operating on a number of platforms, the executable file itself subject to modifications during installation in order to optimize execution of the executable file on a given computer system, the method comprising:

receiving a request to generate a machine independent unique identifier for an executable file that has been installed on a particular machine, for uniquely identifying the executable file across a number of platforms that the executable file may be installed on;

determining portions of the executable file modified as a result of installation on the particular machine, so that those portions of the executable file that are modified for optimizing execution on the given computer system can be safely ignored when attempting to detect unauthorized modifications; and generating a the machine independent unique identifier by performing a calculation based on selected portions of the executable file; said selected portions excluding any machine specific portions of the executable file determined to be modified as a result of installation of the executable file on the particular machine; and detecting future unauthorized modifications to the executable file regardless of which platform the executable file is installed on, using the unique identifier to detect unauthorized modifications to said selected portions.

40. The method of claim 39, wherein said executable file comprises a loadable library.

41. The method of claim 39, wherein said executable file comprises a computer program.

42. The method of claim 39, wherein said determining step includes identifying portions of the executable file comprising import information.

43. The method of claim 39, wherein said generating step includes calculating a message digest for the executable file.

44. The method of claim 43, wherein calculating a message digest for the executable file includes using an MD5 technique.

45. The method of claim 39, further comprising: using the unique identifier for determining integrity of the executable file.

46. The method of claim 39, further comprising: using the unique identifier for determining identity of the executable file.

47. The method of claim 39, further comprising:

storing the unique identifier that has been generated;

using the stored unique identifier for determining if the executable file is subsequently altered.

\* \* \* \* \*